United States Patent [19]
Thompson

[11] Patent Number: 4,868,542
[45] Date of Patent: Sep. 19, 1989

[54] AUTOMOTIVE BRAKE LIGHT AND COMMUNICATION SYSTEM

[76] Inventor: Michael L. Thompson, 68 Ferndale Avenue, Winnipeg, Manitoba, Canada, R2H 1T8

[21] Appl. No.: 234,620

[22] Filed: Aug. 22, 1988

[51] Int. Cl.$^4$ .............................................. B60Q 1/26
[52] U.S. Cl. .................................... 340/468; 340/479
[58] Field of Search .................. 340/89, 90, 93, 97, 340/124, 94, 108–111, 453, 459, 461, 462, 463, 468, 479, 485; 364/426.01; 40/591–593; 362/79

[56] References Cited

U.S. PATENT DOCUMENTS

| | | | |
|---|---|---|---|
| 3,678,457 | 7/1972 | Leu | 340/107 |
| 3,750,138 | 7/1973 | Burgan et al. | 340/97 |
| 3,787,808 | 1/1974 | Knopf | 340/74 |
| 4,191,939 | 3/1980 | Bauman | 340/107 |
| 4,361,828 | 11/1982 | Hose | 340/87 |
| 4,431,984 | 2/1984 | Bileck | 340/84 |
| 4,574,269 | 3/1986 | Miller | 340/87 |
| 4,631,516 | 12/1986 | Clinker | 340/76 |
| 4,677,429 | 6/1987 | Glotzbach | 340/52 F |

FOREIGN PATENT DOCUMENTS

| | | |
|---|---|---|
| 0583095 | 9/1959 | Canada . |
| 0233147 | 2/1975 | Fed. Rep. of Germany ........ 340/97 |
| 2730904 | 1/1979 | Fed. Rep. of Germany ........ 340/97 |
| 3003346 | 8/1981 | Fed. Rep. of Germany ...... 340/124 |
| 3416724 | 11/1985 | Fed. Rep. of Germany ........ 340/97 |

Primary Examiner—Joseph A. Orsino
Assistant Examiner—Jill D. Jackson
Attorney, Agent, or Firm—Murray E. Thrift; Stanley G. Ade; Adrian D. Battison

[57] ABSTRACT

An automobile signalling system includes a programmable processing unit or computer mounted in the vehicle near the driver's station. The unit has a key board and a pre-edit screen for displaying an input from the key board. An output from the processing unit is passed to a light emitting diode display unit mounted in the rear window of the vehicle to cause the LED display unit to produce an illuminated representation of the matter appearing on the screen of the processing unit. Output from the processing unit to the display unit is controlled by the braking system of the vehicle so that a message may be displayed on the display unit only when the brakes of the vehicle are activated.

1 Claim, 5 Drawing Sheets

AUTOMOTIVE BRAKE LIGHT AND COMMUNICATION SYSTEM

FIELD OF THE INVENTION

The present invention relates to a signalling system for automobiles and more particularly to a brake actuated signalling system for automobiles.

BACKGROUND

Various systems for automobile to automobile communication have been proposed in the past. These generally involve the signalling of pre-selected messages from one vehicle to another in response to the manual operation of a switch representing the message to be passed. The present invention is concerned with a novel form of automotive signalling appliance.

SUMMARY

According to the present invention there is provided an automotive signalling system comprising:

a processing unit having a key board, a pre-edit screen for displaying characters input to the processing unit through the key board, an output for display signals representing the characters on the pre-edit screen, and an activating input for activating the output;

means for mounting the processing unit in an automobile;

display means adapted to be mounted in the rear window of an automobile;

first circuit means connecting the display means to the output of the processing unit for displaying characters the same as those on the screen in response to receipt of the display signals;

brake switch means adapted to be connected to the brake system of the automobile for generating a brake signal when the brakes are applied; and second circuit means connecting the brake switch means to the activating input of the processing unit for activating the processing unit output in response to the generation of a brake signal, whereby the characters displayed on the pre-edit screen are displayed on the display means in response to application of the automobile brakes.

With this apparatus, any message can be passed from a vehicle to a following vehicle. The major use of the apparatus is car to car communication, although safety messages and traffic reports can also be passed back through traffic tie-ups. The display unit is mounted in the rear window of an automotive vehicle and is illuminated by the braking system of the vehicle so that it acts as an auxiliary brake light in addition to passing on useful information if desired. Preferably, the processing unit is programmable so that the message entered on the key board can be maintained, removed or recalled according to a selection made by the operator.

BRIEF DESCRIPTION OF THE DRAWINGS

In the accompanying drawings which illustrate an exemplary embodiment of the present invention.

DETAILED DESCRIPTION

Figure 1:
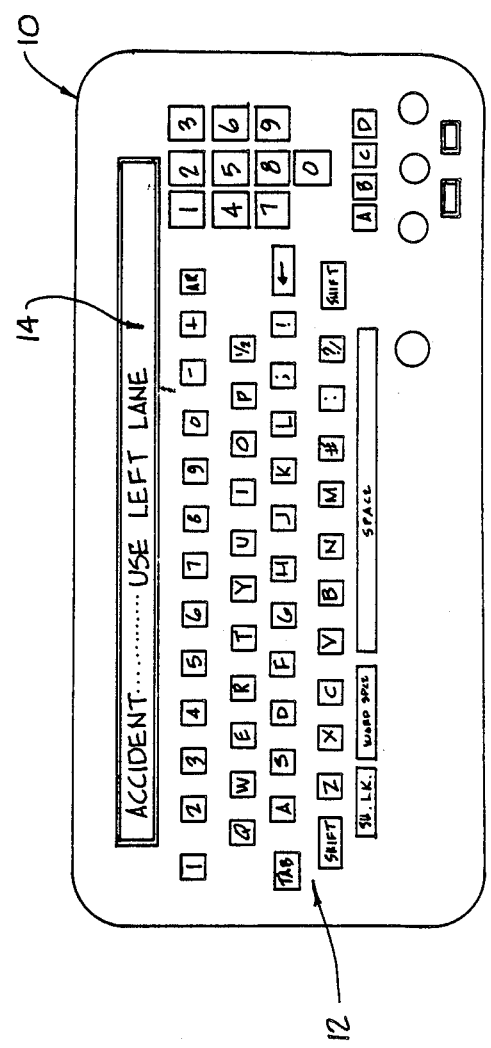
FIG. 1 illustrates the face of the processing unit key board.

Referring to the accompanying drawings, FIG. 1 illustrates a processing unit 10 with a standard key board 12 and a small, thirty character pre-edit display screen 14.

Figure 2:
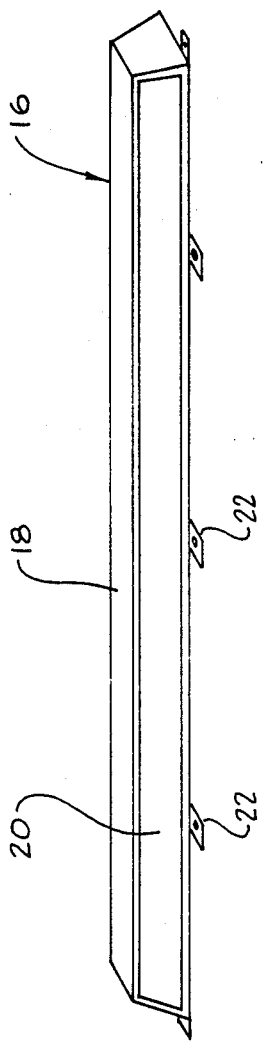
FIG. 2 illustrates the display unit.

FIG. 2 illustrates a display unit 16 that includes a housing 18 of long, thin shape, with a window 20 in its horizontally elongate rear face. The housing contains a light emitting diode display of known form. This can be caused to produce a string of illuminated characters across the window 20. In the preferred embodiment, the characters are illuminated in red. The housing is equipped with mounting lugs 22 that are used to mount the unit on the rear deck just inside the back window of an automobile.

Figure 3:
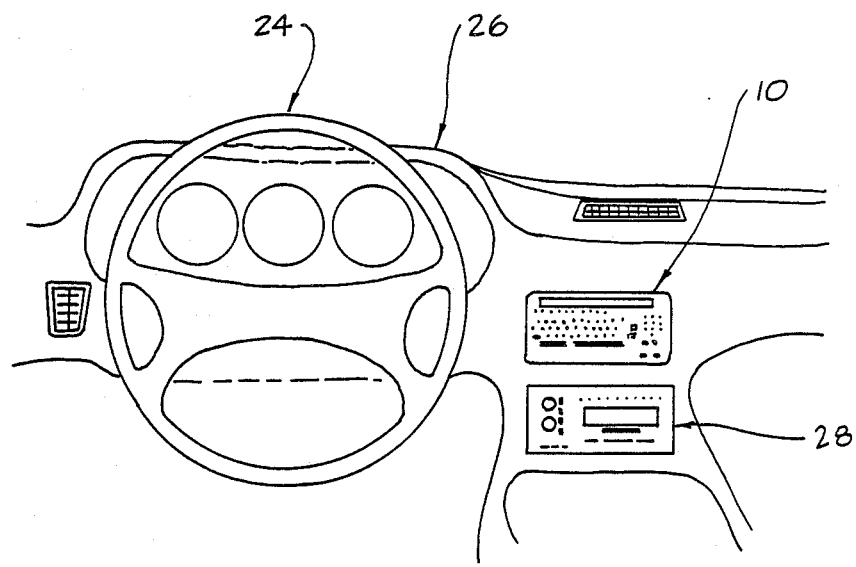
FIG. 3 illustrates the mounting of the processor unit in an automobile.

FIG. 3 illustrates the mounting of the processing unit 10 in an automobile, on the dash board, to the right of the steering wheel 24 and instrument panel 26, and, in this case, above the radio and tape deck 28. The processing unit in this location is readily accessible for re-programming by the driver or a passenger in the other front seat.

Figure 4:
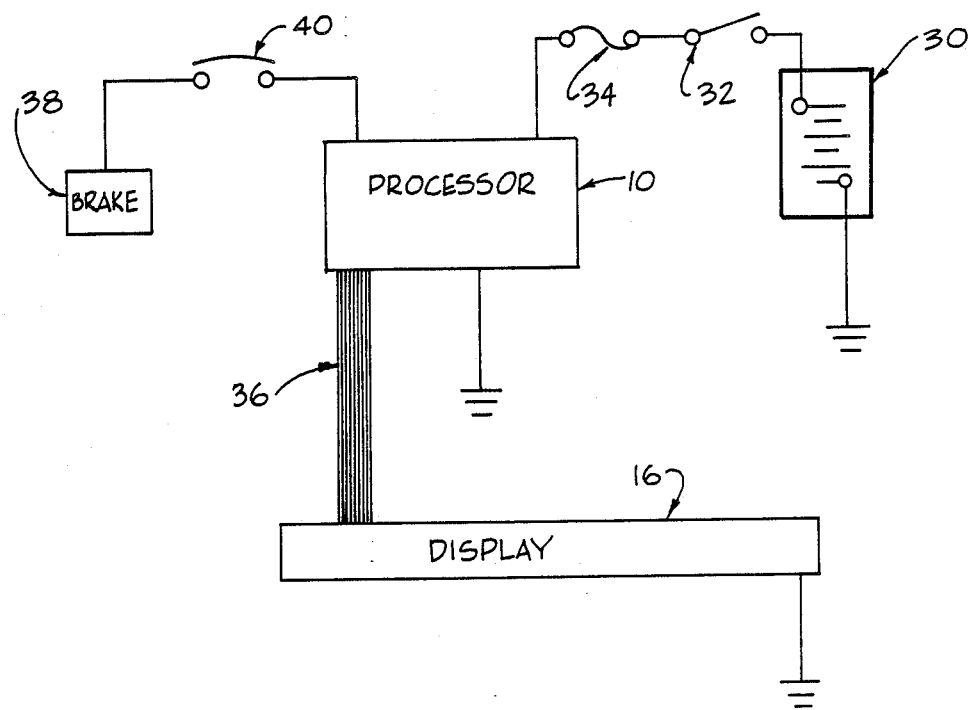
FIG. 4 is a circuit diagram of the system.

FIG. 4 is an electrical schematic of the apparatus. The processor 10 is connected to a battery 30 through an on/off switch 32 and a fuse 34. It is also connected to the LED display unit 16 by a ribbon cable 36 which passes the display signals from the processing unit to the display to cause the display to illuminate a representation of what appears on the screen 14 of the processing unit. The brake system 38 of the vehicle is connected through a push button normally open switch 40 to an input terminal of the processing unit 10. A signal appearing at the input causes the processing unit to produce an output through the ribbon cable to the display unit, causing the display unit to produce the desired display.

Figure 5:
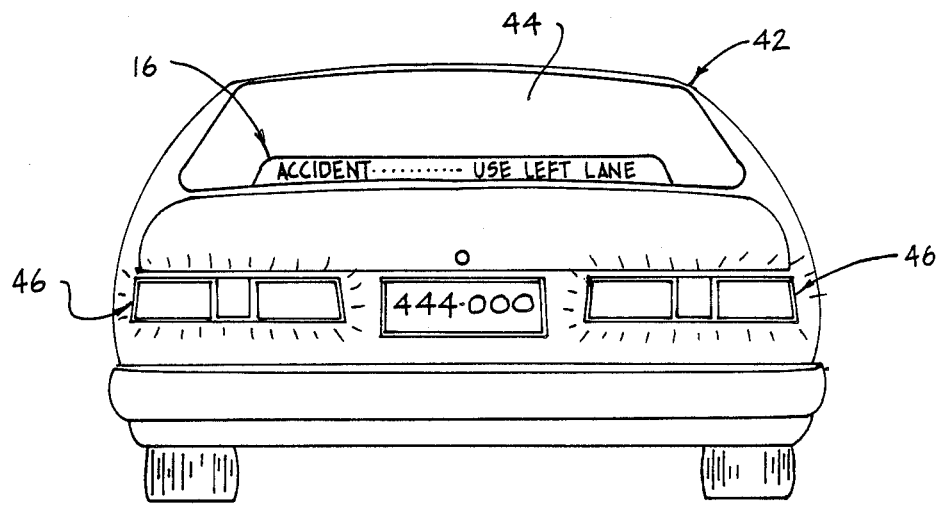
FIG. 5 is a rear view of an automobile, showing the use of the apparatus.

FIG. 5 illustrates the back of an automobile 42 with a rear window 44 through which the display unit 16 is visible. The automobile also has brake lights 46 of the usual type. When the brake lights are illuminated by pressure on the brake pedal inside the vehicle, the switch 40 is closed, producing an input to the processing unit input terminal and generating an output over the ribbon cable 36, causing the display 16 to display the message appearing on the screen 14 of the processing unit.

While one embodiment of the present invention has been described in the foregoing, it is to be understood that other embodiments are possible within the scope of the invention. The invention is to be considered limited solely by the scope of the appended claims.

I claim:

1. An automotive brake light and communication system comprising:

a processing unit having a key board, a pre-edit screen for displaying characters input to the processing unit through the key board, an output for display signals representing the characters on the pre-edit screen, and an activating input for activating the output;

means for mounting the processing unit adjacent a driver's position in an automobile;

display means adapted to be mounted in the rear window of an automobile;

first circuit means connecting the display means to the output of the processing unit for displaying characters the same as those on the screen in response to receipt of the display signals;

brake switch means adapted to be connected to the brake system of the automobile for generating a brake signal when the brakes are applied; and second circuit means connecting the activating input of the processing unit exclusively to the brake switch means for activating the processing unit output solely in response to the generation of a brake signal, whereby the characters displayed on the pre-edit screen are displayed on the display means in response to the application of the automobile brakes.

* * * * *